March 18, 1958 E. F. AINSWORTH 2,827,623

MAGNETIC TAPE INSCRIBER-OUTSCRIBER

Filed Jan. 21, 1955

4 Sheets-Sheet 1

INVENTOR

Ernest F. Ainsworth

BY

Arthur Vinograd

ATTORNEY

March 18, 1958 E. F. AINSWORTH 2,827,623
MAGNETIC TAPE INSCRIBER-OUTSCRIBER
Filed Jan. 21, 1955 4 Sheets-Sheet 2
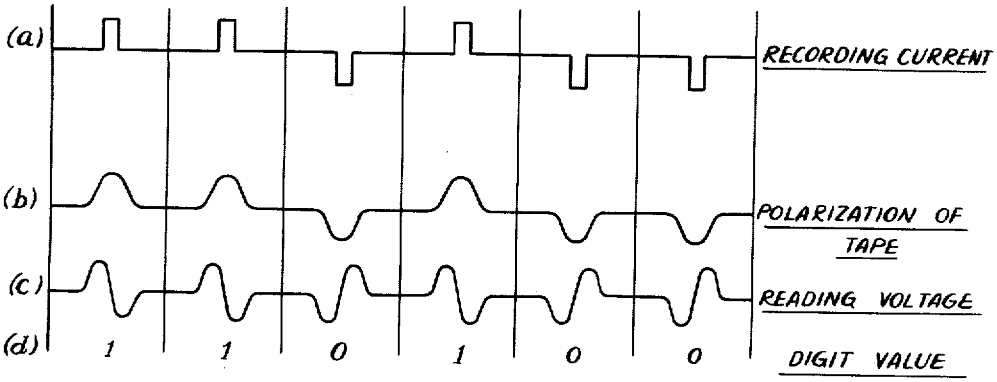
Fig- 2-A
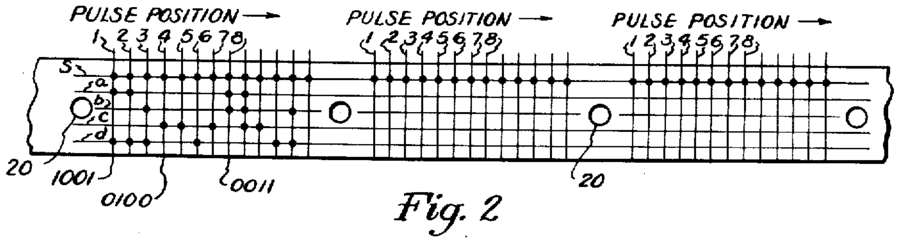
Fig. 2
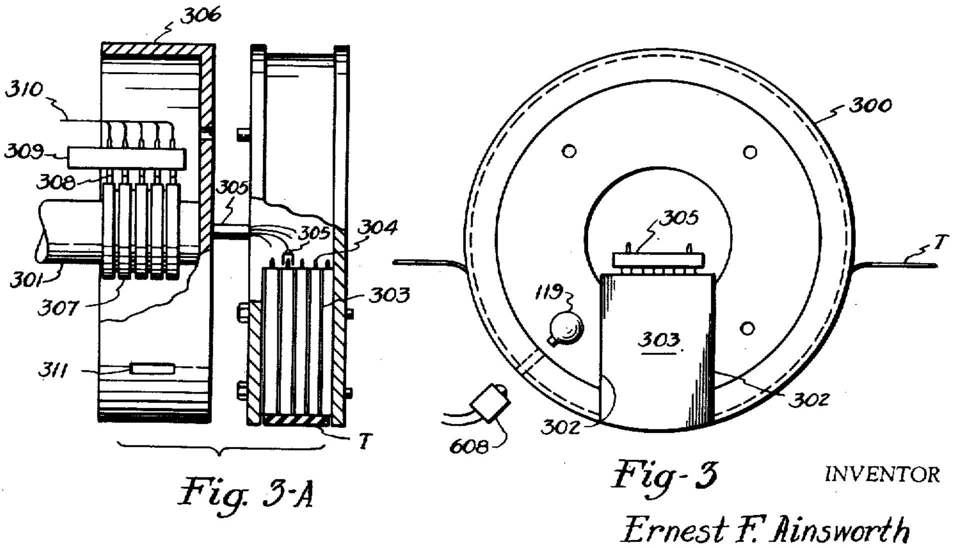
Fig. 3-A, Fig-3
INVENTOR
Ernest F. Ainsworth
BY
Arthur Vinograd
ATTORNEY March 18, 1958 E. F. AINSWORTH 2,827,623

MAGNETIC TAPE INSCRIBER-OUTSCRIBER

Filed Jan. 21, 1955 4 Sheets-Sheet 3

INVENTOR

Ernest F. Ainsworth

BY Arthur Vinograd

ATTORNEY

MAGNETIC TAPE INSCRIBER-OUTSCRIBER

Filed Jan. 21, 1955 4 Sheets-Sheet 4

INVENTOR
Ernest F. Ainsworth
BY
Arthur Vinograd
ATTORNEY

United States Patent Office 2,827,623
Patented Mar. 18, 1958

2,827,623

MAGNETIC TAPE INSCRIBER-OUTSCRIBER

Ernest F. Ainsworth, Chevy Chase, Md., assignor to the United States of America as represented by the Secretary of Commerce Application January 21, 1955, Serial No. 483,448

9 Claims. (Cl. 340—174)

This invention relates to the art of information recording and more particularly concerns an apparatus and method for producing an accurate record of stored information for subsequent introduction to a device such as a large scale electronic digital information processing apparatus.

Such devices require that the information designating a particular problem be presented in a specified coded form corresponding to discrete pulses. In order to accurately transfer large amounts of data from a form which cannot be accepted by the apparatus to an acceptable form, it is necessary for trained operators to accurately transcribe information having visual significance into a coded form of a type that can be handled by the data processing apparatus at electronic speeds. It is also necessary to transcribe the results of the processing from a form usable by the apparatus to a form which can be interpreted by the operator.

It is common practice to employ expedients such as perforated paper tape, punched cards, and magnetic recordings on wire, tape or drums as preliminary information storing devices on which known intelligence is transcribed into coded form for subsequent introduction into the apparatus at electronic speeds. Much of the data upon which a particular machine operation depends, however, exists in the form of handwritten or typewritten material. The transferring from one form of intelligence to another coded form requires a human operator who can read the material, properly interpret the substance thereof, and actuate a mechanism which will record the information in a suitable coded form in some type of storage medium. For example, the operator may read a symbol on a paper, strike a corresponding key on a typewriter-like keyboard of a transcriber which causes a binary digit pattern representing such symbol to be automatically inscribed on a recording medium such as, for example, magnetic tape. The tape is then advanced sufficiently to be in position to receive a subsequent coded symbol. The striking of the key on the keyboard usually also causes the printing portion of the inscribing device to print the desired symbol colaterally on a paper record carried by the transcriber so that it may be identified and correlated with the coded data inscribed on the tape for checking purposes.

Since a modern electronic data processing machine will perform thousands of operations per minute based on the information introduced by the operator, it is apparent that any error in the information so introduced into a machine may be multiplied and therefore produce highly erroneous results. It is the present practice therefore to painstakingly check and recheck the data introduced by the referred to semi-manual method in order to eliminate any possible source of error due to data introduction. Such checking is obviously expensive and tedious. For example, the operator may compare the typed symbol with the one appearing on the original paper from which he had obtained such information, but such comparison does not assure that the symbol has been recorded on the tape. To check the accuracy of the latter, the completed tape is taken and run through a reading device which is connected to the transcriber instrument to cause the latter to type out intelligence corresponding to the coded information which has been recorded on the tape. It is then necessary to compare the original typed copy with that retyped from the recorded tape. If an error is found it must then be determined whether such error was incurred in the act of inscribing or reading from the tape. After the cause of the error has been determined, moreover, it is still necessary to accurately locate the portion on the tape in which such error appears in order to correct the recording. Such method obviously lacks flexibility, is time consuming and costly.

The present invention contemplates a system for preparing information of properly coded character for introduction into a data processing machine by employing a typewriter-like transcribing instrument for inscribing in coded form on a magnetic tape, the information presented to the operator in visual form. The operator records the information on the tape by actuating a selected key of a typewriter-like instrument and such act also results in the appearance of a printed symbol on the paper record sheet carried either by the same or a colateral transcriber. However, the printed symbol so typed out appears to be, but is not that directly resulting from the actuation of the keys, and is actually the result of a sequence of events occurring in a millisecond interval initiated by the act of pressing the key. Such sequence includes the steps of storing the information in coded form, accurately determining the position of a store area on the tape where such information will be inscribed, memorizing such position inscribing such information on the store area, subsequently re-establishing the memorized position, reading the information so recorded, and causing such sensed information in signal form to actuate an outscribing mechanism of the transcriber which will translate and print the coded signals into a readable form. As will appear, the symbol actually printed out by the transcriber will be derived from a signal which is the result of an actual comparison, performed at electronic speeds, by the apparatus of this invention, between the information introduced as a result of pressing the keys and that recorded in the magnetic tape and subsequently read therefrom for checking purposes.

It is therefore an object of the present invention to provide a device which will permit the rapid transcribing of intelligence into coded stored signals.

It is a further object of this invention to provide an information transcribing system of the character described which permits each entry to be automatically checked for accuracy as it is made.

Another object of this invention is to provide an information transcribing system in which each entry is accurately located with respect to the position which it occupies on the recording medium so that errors manifested during information entry can easily be located and corrected.

A preferred embodiment of the invention is particularly described in the accompanying drawings in which:

Fig. 2 shows a portion of a magnetic tape which may be employed as the record storage medium and further details the character of the coding employed, the synchronizing channel and the means provided for positioning the tape;

Fig. 2A is a waveform chart pertinent to Fig. 2;

Fig. 3 represents a front view of a multichannel transducer head of the type employed to record information and to read stored information from the tape according to the present invention;

Fig. 3A is a side elevation of the transducer head shown in Fig. 3;

Figure 1:
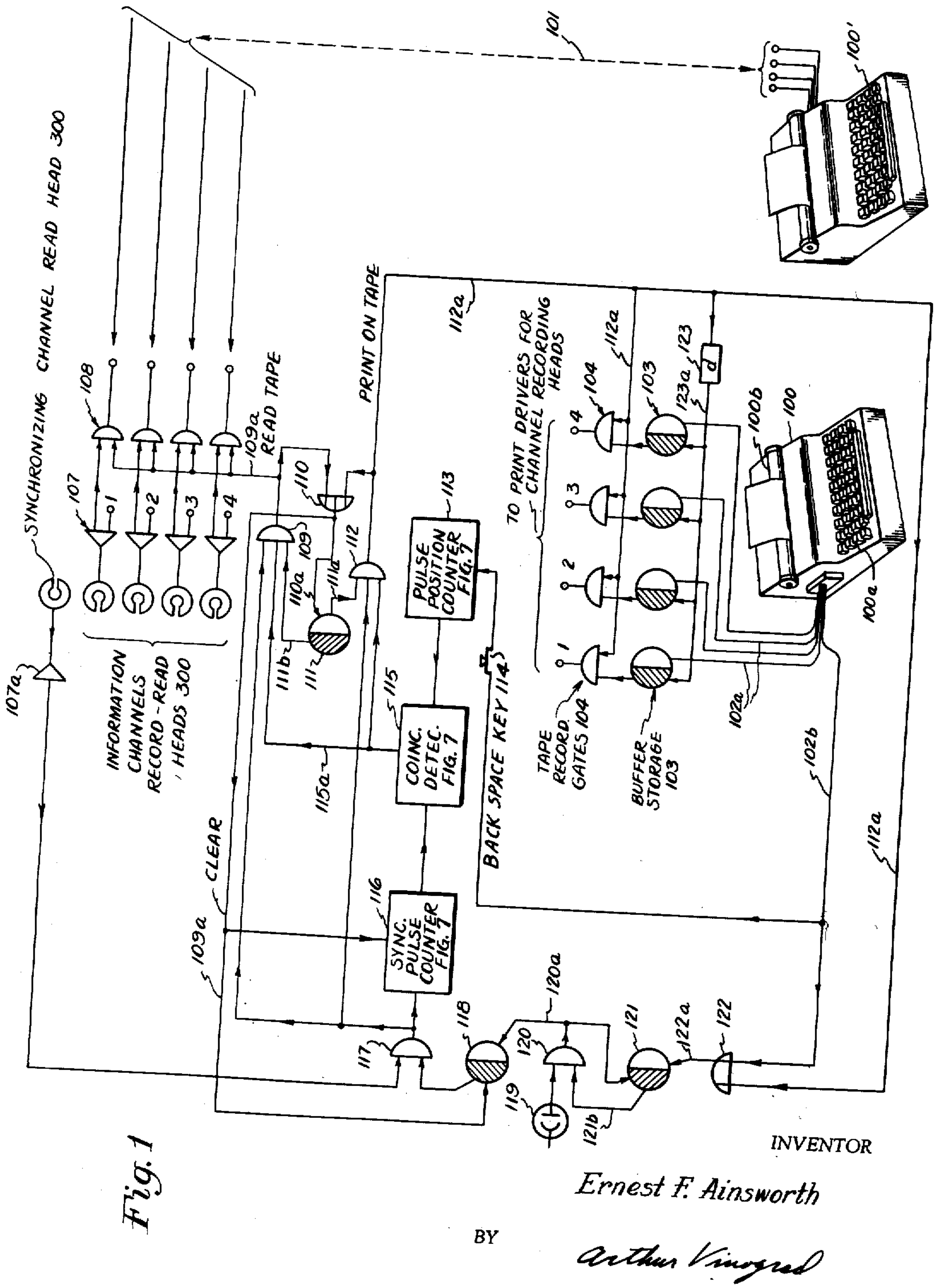
Fig. 1 is an overall schematic of the mechanism involved in the present invention.
Figure 5:
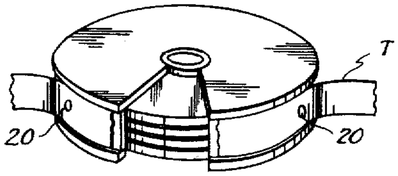
Fig. 5 is an isometric view showing in greater detail, the relationship between the transducer head and the tape.

Before describing the construction and operation of the overall system shown in Fig. 1, the purpose and function of certain of the components necessary to the operation of the system will be detailed.

*Information storage mechanism*

The information to be inscribed in the storage medium is converted into a binary coded form by the code selector mechanism which will be described in connection with the transcriber. As is well known, any preferred pulse representation system may be employed for such purpose. That is, information such as a decimal number, for example, can be expressed in binary coded form by employing a multi-position code representation, each place of which corresponds to a power of two and expressing the decimal number by one or more combinations of such powers of two. In such binary system, for example, a decimal 9 may be expressed by 1001, a decimal 4 by 0100 and a decimal 3 by 0011. A typical illustrative example of such coded representation is illustrated in Fig. 2.

In Fig. 2, each vertical column 1, 2, 3 etc., extending transversely of the tape length comprises a discrete store area in which there may be coded an information word or "bit" occupying the code pulse positions *a*, *b*, *c*, and *d*. Thus the rows of dots *a*, *b*, *c*, and *d* in vertical column numbered 1 correspond to 1001 in binary notation and represents a binary coded decimal 9. Similarly row 4 represents a decimal 4 while row 8 represents a 3.

The row designated as S in Fig. 2 represents the synchronizing or sprocket channel pulses. The synchronizing channel S comprises a series of pre-recorded, precisely time spaced marker pulses each of which permanently delineates the position of any of the vertical columns of pulses to be inscribed. A detailed description of a synchronizing channel system of information storage is to be found in the U. S. patent to Cohen, 2,540,654, as well as in the copending application, Serial No. 449,286 of John R. Sorrells, filed on August 11, 1954, and assigned to the assignee of the present case.

Briefly, the pre-recorded pulses contained in the synchronizing channel S as described in the referred to references, may be employed as a synchronizing means to limit the storing and reading of information precisely to the discrete store areas on the recording surface corresponding to the vertical columns designated as 1, 2, 3 etc. in Fig. 2.

In the case of a magnetic recording surface, the inscribed information may be manifested in various ways one of which is illustrated by way of example in Fig. 2, by either the presence or absence of a magnetized spot at the pulse positions corresponding to *a*, *b*, *c*, or *d*. Such spots are symbolized in Fig. 2 as black dots. Actually, as shown in Fig. 2A the magnetized spots are created by recording current pulses as symbolized at (*a*) in Fig. 2A, the position of each pulse corresponding to that of the synchronizing pulses in synchronizing channel S. The corresponding polarization of the tape is indicated by waveform (*b*) in Fig. 2A while waveform (*c*) shows the reading voltage obtained by subsequently sensing a magnetic surface which has been magnetized in accordance with waveform (*b*).

While any type of recording medium could be employed with the present invention, for purposes of explanation, a magnetic tape type of information storage device is disclosed, of known commercial type and which is provided with spaced index markers 20. Such markers may take any form such as, for example, a perforation capable of transmitting light to a photocell or completing an electrical contact. Alternately, the marker 20 may comprise a transparency on an opaque tape or vice versa. Distinctly magnetized spots are also feasible for such purpose. In any event, the series of equidistant index markers 20 define exactly spaced information recording areas therebetween each of which determines the number of words or bits of information that will appear between markers. A like number of information words precisely positioned with respect to each marker 20 will thereby be defined in each such area.

Recording and reading of information on the tape is performed by a rotatable transducer head system of the type illustrated in Figs. 3–6. The tape T is bodily shiftable with respect to the transducer head 300, which is independently rotatable about a fixed axis 301, so that adjacent markers 20 will equidistantly straddle the head as is clearly illustrated in Figs. 3, 5, and 6. The head, 300, when cyclically rotated with respect to the tape about its axis of rotation 301, will then repeatedly scan the surface area of the tape between the index markers 20 so long as the tape is held in the described relationship to the head. The head revolves fast enough so that when the tape is standing still, or moving slowly, the relative speed between the tape and head is of the same order of magnitude as that ordinarily used in reading into the apparatus to which the information is to be applied.

Figure 6:
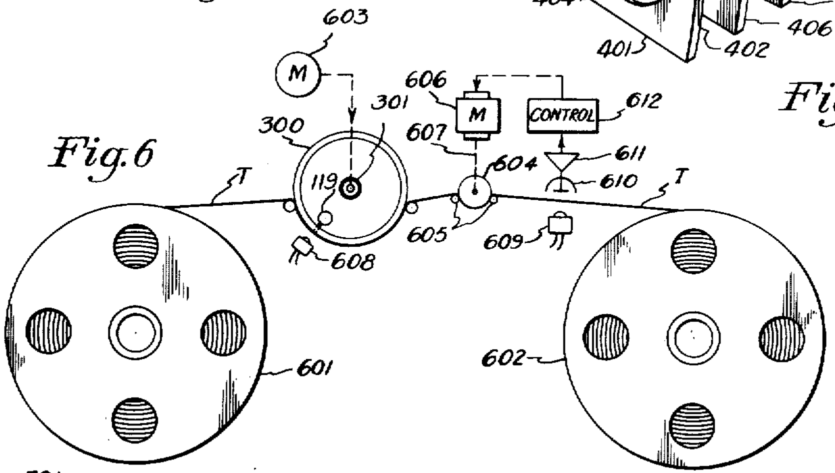
Fig. 6 is a diagrammatic illustration of a typical tape handling mechanism such as is employed with the present invention.

The presence of the markers 20 enables accurate positioning of the tape with respect to the head in the desired manner. A portion of a typical tape handling mechanism is illustrated in Fig. 6 as including a pair of tape reels 601, 602, the rotatably mounted transducer head 300 driven by a motor 603 independently of the tape drive mechanism, and a tape drive capstan 604. The capstan cooperates with a pair of releasable clutch operator rollers 605—605 in a known manner and is driven by a reversible motor 606 through shaft 607. The transducer head 300 as will be described includes a photocell 119 located within the transducer head. A first light source 608 cooperates with such photocell. A second light source 609 is located in proximity to a second photocell 610 which is connected by amplifier 611 to a reversible motor 606 through a servo control circuit 612 of conventional construction, such as is described, for example, in the above referred to copending application to Sorrells.

Briefly, the identified control circuit includes a multiple magnetic clutch arrangement for determining the drive of the capstan 604. The control circuit is normally responsive to forward, stop, and reverse signals applied from an external circuit and controls the coils of the magnetic clutches through a conventional control circuit such as the thyratron control described in the Sorrells application. The arrangement shown in Fig. 6 is easily adapted to such described control mechanism since the signal supplied from the second photocell 610 may be employed to control the normally moving capstan 604 to position the portion of the tape defined by two of the markers 20 so that it will straddle the transducer head.

The tape T is threaded around a portion of the circumference of the head 300 and around the capstan 604 as shown in Fig. 6. In such position, the tape intercepts each of the light beams provided by sources 608 and 609. Since the markers 20 on the tape with which the photocells cooperate are equidistant, the tape positioning photocell can easily be located in relation to the center of head 300 so as to orient the portion of the tape between adjacent index markers substantially equidistantly with respect to the vertical center line of the head.

*The transcribing head 300 (Figs. 3–5)*

The transcribing head 300 employed with the present invention may comprise a multichannel magnetic recording and reading head which is rotatably driven in a cyclic manner by a power shaft 301. The head comprises a flanged wheel which defines a channel adapted to snugly accommodate the tape T. The wheel is recessed as at 302—302 to provide a radially extending slot for receiving a magnetic transducer element 303.

Figure 4:
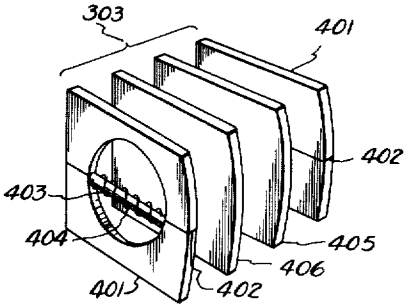
Fig. 4 is an exploded view showing the construction of the magnetic element of the transducer head.

The multichannel magnetic element 303 does not form part of the immediate invention and only sufficient details are illustrated in Fig. 4 as are necessary for explanatory purposes. The magnetic element in the present example may be of a type manufactured by the Raytheon Manufacturing Company and comprises a plurality of magnetizable cores in the form of thin plates 401, two of which are illustrated in Fig. 4. Each magnetic plate has a gap 402 and a core portion 403 provided with an extremely flat magnetizing winding 404. Adjacent magnetic plates are electrically insulated from one another by a thin separator 405 and additional magnetic shielding between heads is provided in the form of thin magnetic shields such as 406. Fig. 4 is an exploded view showing the assembly of elements between the adjacent heads. It will be apparent that a plurality of such assemblies may be compounded in order to produce a head assembly having any desired number of transducer elements corresponding to the number of information tracks or channels on the particular tape employed. The thickness of each of the magnetizable elements 401 shown in Fig. 4 corresponds approximately to the width of each of the information channels S, *a*, *b*, *c*, and *d* illustrated in Fig. 2.

The magnetic element 303 is further shown in Figs. 3–3A in the position it occupies in connection with the transcribing head 300. The referred to magnetizing windings 403 (Fig. 4) terminate in contacts 304 (Fig. 3A) and may easily be connected to an external circuit by thin slip-on connectors 305 adapted to be plugged on to the respective terminal of each channel head. The connections are brought out to the external circuitry by cable 305 in the following manner.

A cup-shaped member 306 is bolted to the wheel 300 and serves as a housing for a plurality of slip rings 307 fixed to shaft 301 and corresponding in number to the number of channels employed. Each of the magnetizable cores 401 is individually connected to a respective slip ring through cable 305 and signals are taken off for subsequent utilization by brushes 308 mounted on a fixed support 309, through a cable 310. A light slot 311 is further provided in the periphery of the cup-shaped member 306 which is adapted to periodically transmit the light beam from source 608 to the photocell 119 which is fixed within member 306 and is normally screened by the periphery of the cup 306.

The tape T is shown in the position it occupies relative to the head 300 in Fig. 3. It will be noted from Figs. 5 and 3 that the tape will normally be positioned so that the index markers 20—20— are medially arranged with respect to the center line of the wheel. As the transcribing head 300 cycles in a counterclockwise direction for example, it will be apparent that slot 311 will repeatedly scan the index marker 20 which it first encounters and the magnetic element 303 will sweep the area of the tape between adjacent markers 20. When the slot 311 passes the referred to index marker 20, a pulse will be generated by photocell 119 thereby indicating that the magnetic element of the transducer head is then positioned at the beginning of the portion or area of the tape on which information is to be recorded. As will be made apparent, such pulse is applied to a signal control circuit which initiates the synchronizing pulse counter 116 of Fig. 1. The pulse counter 116 is then controlled by the referred to sprocket channel pulses in the synchronizing channel S of the tape. In such manner, the displacement of the transcribing head (away from the initial index marker 20) is synchronized with respect to the incremental store areas defined by the columns 1, 2, 3, etc. shown in Fig. 2.

*Transcriber 100, 100′ (Figs. 1 and 9)*

One or more typewriter-like transcribers 100—100′ is employed for introducing and receiving the information and may consist of any well-known type of commercially available coded signal transmitter-receiver capable of transmitting coded signals in response to depression of a selected key and automatically receiving and reconverting coded signals into printed intelligence. Examples of such available instruments are the Teletype and Flexowriter, both of which include a typewriter-like keyboard, means for transmitting signals representing the intelligence imparted by depression of the selected key, means for receiving transmitted signals and converting them into printed intelligance.

A Flexowriter model FL transcriber manufactured by the Commercial Controls Corporation represents a convenient instrument for performing the transcription steps involved in the present invention. For purposes of disclosure, only those details of construction and operation necessary to an understanding of the manner in which such instrumentality cooperates with the present invention will be described since the details of the machine construction are known and otherwise available.

Figure 9:
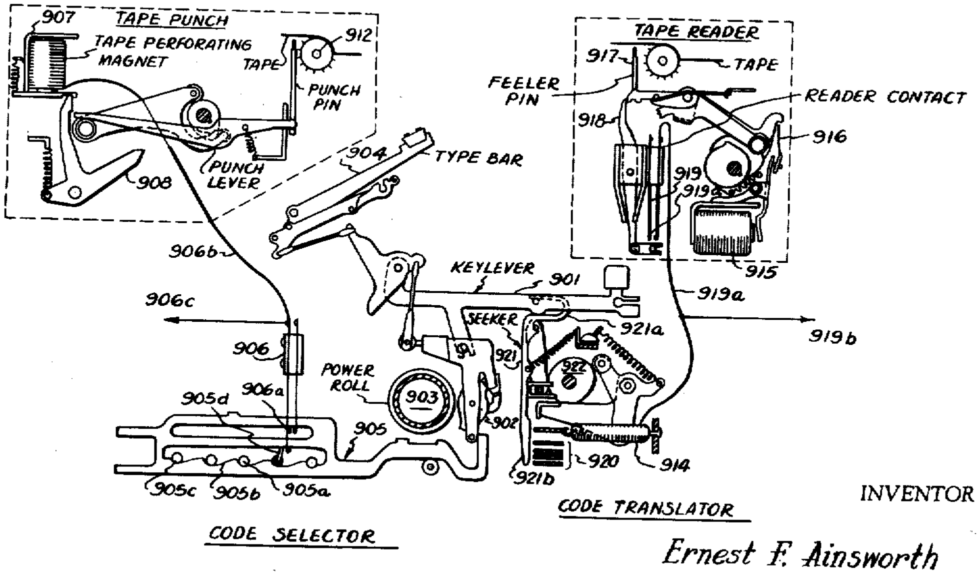
Fig. 9 represents a functional diagram of a known type of intelligence transcriber which is employed with the present invention.

Fig. 9 is a schematic diagram illustrating the functional principles of the portion of the Flexowriter necessary to an understanding of this invention. Referring briefly to Fig. 1, the Flexowriters 100—100′ each includes a typewriter-like keyboard **100*a*, and a platen 100*b* for carrying a record sheet on which symbols are printed. The Flexowriter as commercially supplied includes also a code selector and a code translator. The code selector converts the information corresponding to the intelligence introduced by the striking of a selected key on the keyboard into a coded electrical signal corresponding to a group of signals. According to the described binary system of notation, for example, a four-place row of pulses corresponding to one of the vertical rows shown in Fig. 2 is generated and transmitted in parallel by such code selector through cables 102*a* represented in Fig. 1. For each such coded group of pulses, an entry signal is concurrently transmitted through cable 102*b***.

Each keylever on the keyboard **100*a* of the Flexowriter is designated as 901 in Fig. 9. Depression of a keylever 901, during the normal operation of the transcriber results in contact between a cam 902 and the power roll 903 and the type bar 904 is thereby forced against the platen to print a symbol corresponding to the keylever struck. Simultaneously the portion 901*a* of the keylever causes positioning of the code selector slide 905 corresponding to the particular keylever 901. In the standard transcriber, the code selector consists of a bank of slides such as 905 and a respective code selector slide is provided for each keylever of the keyboard. Only a single such selector slide and keylever has been illustrated in Fig. 9 for purposes of explanation. The purpose of the code selector is to select a different binary code corresponding to each individual character represented on the keyboard 100*a*** of the Flexowriter. Operation of the code selector mechanism produces a binary code as represented by an open or closed position of an electrical contact.

Referring to Fig. 9 each slide 905 cooperates with a series of bails 905a comprising a common bail 905c and an additional number of bails corresponding respectively to the pulse positions *a*, *b*, *c*, and *d* identified in Fig. 2. It is to be understood that these bails extend across and are threaded through the entire bank of slides. Each slide has a specially cut cam surface 905b whereby the undercutting of a surface according to a predetermined pattern results in the presence of one or more camming protuberances which can be identified with the particular binary coding employed. A remote end of each such bail is provided with an operating lever 905d only one of which is diagrammatically illustrated in Fig. 9 engageable with a predetermined one of a plurality of pulse generating contactors 906, having contacts 906a, provided adjacent the bail ends.

It will be apparent, therefore, that shifting of a slide 905, the cams 905b of which correspond to the binary representation of that particular slide, consequent to the depression of a key, will lift a corresponding number of the bails and cause the associated operating lever 905d to close a respective one of the normally open contacts 906a. For example, in order to obtain the binary representation "1001" corresponding to pulse position "1" in Fig. 2 a slide having two spaced cam protuberances 905b separated by a valley would have been selected, shifting of the slide thereby actuating a corresponding pair of the contacts to transmit a pulse word corresponding to 1001.

In the transcriber as normally obtained such pulses will be transmitted through respective lines 906b to a tape perforating solenoid 907 which forms part of the standard transcriber as commercially obtained. Solenoid 907 releases latch lever 908 and causes power drive cam 909 to actuate the tape punch 911 through lever 910. Since the tape punch mechanism is dispensed with when the described transcriber is employed with the present invention, signals generated by the contactors 906 are tapped off power line 906b by a corresponding branch line 906c. Five of such branch lines form the cable 102 shown emanating from transcriber 100 in Fig. 1. Four of the branch lines represented by cable portion 102a carry the desired coded intelligence signals which is thereby applied in parallel to buffer storage 103. Since the common bail 905c is actuated each time any slide is operated, the fifth branch line 906c, as represented by position 102b in Fig. 1 of the cable will transmit a pulse to gate 122 and pulse position counter 113 each time a key is struck.

*Code translator*

The code translator portion of the transcriber designated in Fig. 9 comprises a mechanism which responds to received coded electrical impulses and mechanically selects the operating keylevers such as 901 to cause actuation of a printing bar such as 909. The received pulses operate contacts according to a pattern established by the code employed to automatically control the printing mechanism for each code read, thus reproducing the information carried by the pulses. The translator includes a code translator magnet 914 for each unit of the binary code plus a magnet 915 for operating the one-cycle clutch 916. In the transcriber as commercially obtained, the tape reader represented by a row of feeler pins such as pin 917 senses the presence of a perforation in the tape and trips the contact lever 918. Lever 918 is a pivoted bar which closes the contacts 919a of a contactor 919 associated with each of the feeler pins. The sensing of a perforation thereby causes an electrical signal to be transmitted to code magnet 914. Since there is a feeler pin 917 provided for each perforation comprising a binary code, a corresponding number of code translator magnets 914 will be energized depending upon the pattern of the code received.

The code translator includes a group of seeker bars such as 921 arranged as a unit. One of such seeker elements 921 illustrated in Fig. 9 as comprising a lever having a shank portion 921b and a hooked portion 921a. The hook portion 921a is engageable with a stud on the keylever 901 and, upon cycling of the power driven cam 922, the seeker bar 901 acts through the key bar 901 to actuate the type bar 904. A series of permutation bars 920 are normally provided in the described transcriber juxtaposed to the various code translator magnets 914. The magnets act as latches to hold the spring biased permutation bars in retracted position. A particular combination of magnets 914 will become energized upon receipt of a code signal of a nature symbolized by any of the vertical rows in Fig. 2 and corresponding permutation bars will therefore be projected into active positions. The permutation bars are each provided with teeth in a manner whereby certain combinations of permutation bars define a clearance channel for a particular seeker element 921. The received code in this manner selects a particular seeker lever or levers which in turn determine the symbol to be printed.

According to the present invention, the tape perforator and tape senser may be dispensed with. In the code selector, a signal line 906c is tapped off from line 906b and is employed to directly transmit code signals through cable 102 as described.

Since it is not desired primarily to print the direct result of the key struck, as pointed out in the objects, a second transcriber 100' (Fig. 1) similar to the first is provided. The tape perforating and sensing portion of the second transcriber is also dispensed with and the leads 919a of the tape reader mechanism are instead tapped by a lead 919b and connected through a suitable terminal box to the cable indicated as 101 in Fig. 1. Since such cable is connected to the tape reading gates 108, the application of the signals received from the magnetic tape as will be described is applied to the transcriber 100' through the tapped connection 919b and will therefore energize the code translator magnets 914 in the described manner.

The transcriber 100' thereby produces a visual printed record of the information introduced as a result of actuating the keyboard of transcriber 100 which record represents the magnetically recorded information applied by the latter and later sensed. As will be apparent to those skilled in the art, a single transcriber of the described type can be suitably modified to perform both of the described input and output functions. Also a variety of available instrumentalities can readily be employed. In order to keep the description to a minimum an obvious embodiment employing readily available equipment has been disclosed.

*Coincidence position finding circuit (Fig. 7)*

Figure 7:
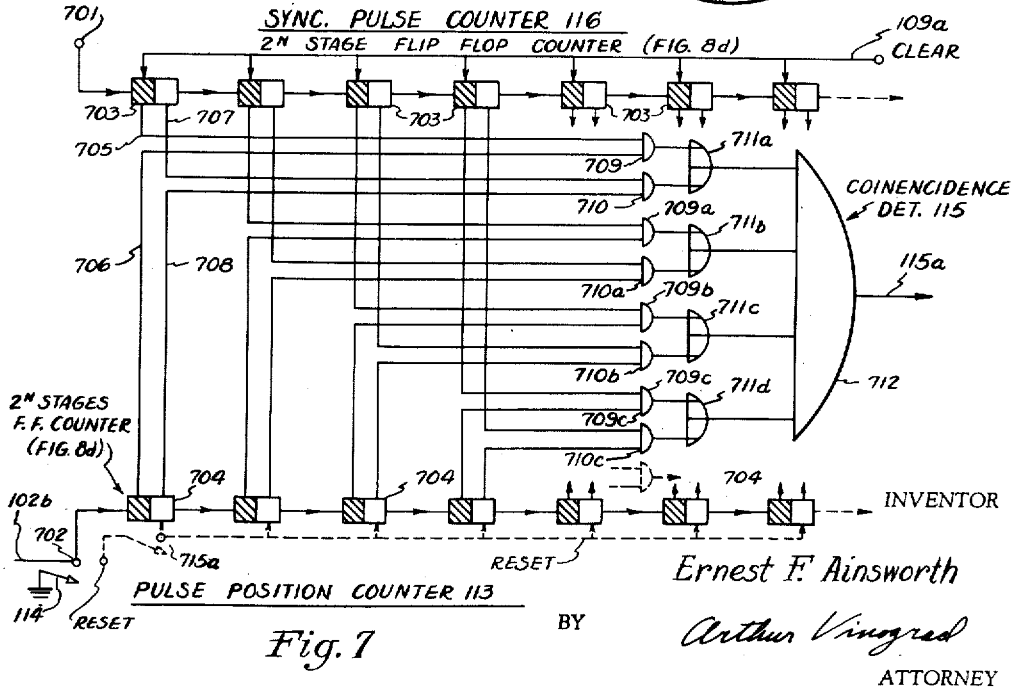
Fig. 7 is a detail of a portion of the circuit of Fig. 1 showing in greater detail the arrangement of the components comprising the coincidence circuit.

The position finding circuit is detailed in Fig. 7 and includes synchronizing pulse counter 116, pulse position counter 113 and coincidence detector 115. The purpose of the position finding circuit is to enable any one of the vertical columns of recording areas on the tape designated as 1, 2, 3, 4, etc. in Fig. 2 to be precisely located and memorized and positioned with respect to the transducer head.

Briefly, as the transcribing head 300 sweeps a particular area of the tape beginning with an index marker 20, the synchronizing pulse counter 116 will be gated by coincidence of a number of control signals including a marker pulse from photocell 119, and the synchronizing pulse counter 116 will then count off in sequence each of the pre-recorded synchronizing marker pulses in channel S of the tape as sensed by the corresponding one of the sensing elements. The pulse position counter 113 is advanced upon each entry resulting from actuation of a transcriber key and coincidence between the two counts as manifested by coincidence detector 115 will obviously locate an area on the magnetic record medium conforming to the entry number and aligned with one of the pre-corded synchronizing marker pulse positions. The displacement of the transcribing head 300 as it scans the record material during each cycle is thereby precisely synchronized with each of the synchronizing markers and, at any instant in which coincidence should be detected, it will be obvious that the position of a particular store area on the tape has been established and defined. Since, as will be pointed out, the pulse position counter in effect memorizes such position, the detection of coincidence during a subsequent cycle of the transcribing head will locate the same position of the store area.

*Synchronizing pulse counter 116 (Fig. 7)*

The purpose of the synchronizing pulse counter 116 is to count in sequence, the synchronizing marker pulses contained in the synchronizing channel S of the tape. Initiation of the synchronizing pulse counter 116 is controlled by a marker 20 in the tape as it is scanned by photocell 119. It then counts in sequence all the synchronizing marker pulses in the synchronizing channel between adjacent index markers and is reset to zero upon application of a clearing pulse. Thus as the rotating transcribing head 300 continuously sweeps the extent of a selected portion of the magnetic tape between index markers, it will be apparent that synchronizing pulse counter 116 will be continuously clicking off in sequence counts corresponding to the synchronizing pulses between perforations.

Figure 8:
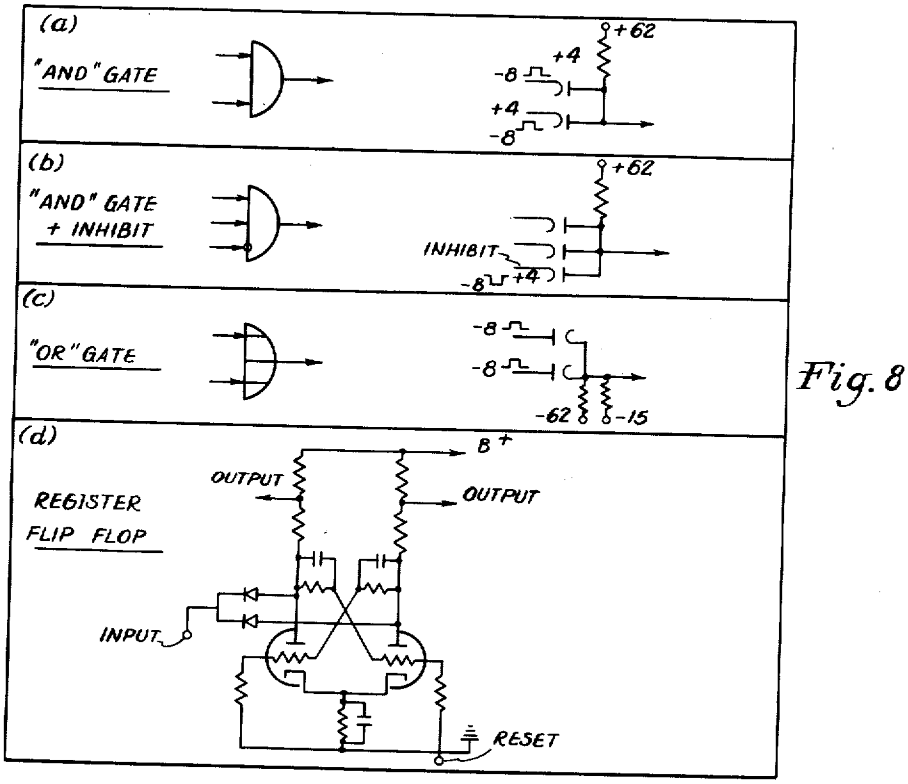
Fig. 8 is a chart identifying the symbols employed in the schematic views.

The synchronizing pulse counter 116 may comprise any high speed commercially available electronic counter of the type that can be reset by application of a clear pulse. Inasmuch as the action of coincidence detector 115 automatically manifests agreement between the counters 116 and 113, it is unnecessary to employ an elaborate counter circuit to indicate the specific character of the count. A simple scale-of-two flip-flop counter 116 such as is shown in Fig. 7 is employed. The detailed construction and operation of such counter is fully described on pages 208–210 of "Electronics Experimental Techniques," by Elmore and Sands, published by McGraw-Hill. The counter comprises a plurality of stages 703 each of which has the construction shown in chart (*d*) of Fig. 8. The elements identified in the chart *d*, Fig. 8 are described in an article entitled, "Dynamic circuit techniques used in SEAC and DYSEAC," by Elbourn and Witt, appearing in Proc. I. R. E., vol. 41, October 1953, on pages 1380–1387. The synchronizing pulses read from the synchronizing channel on the tape are applied at terminal 701 while the output signals applied to the input of coincidence detector 115 are obtained from terminals 705, 707. The reset signal is applied to the various stages of the synchronizing pulse counter through the "clear" line 109*a* as indicated in Fig. 7.

*Pulse position counter 113*

The pulse position counter 113 is also symbolically shown in Fig. 7 as comprising a plurality ($2^n$ stages) 704 of conventional high speed electronic counter units similar to the identified synchronizing pulse counter stage and identified by chart *d* in Fig. 8. Input terminal 702 of the counter chain is provided with the referred to back spacer key 114 and, when such key is opened, it is obvious that no further counts can be registered. Since the purpose of the pulse position counter is to locate each of the vertical column store areas 1, 2, 3, 4, etc. shown in Fig. 2 between adjacent index markers 20, the pulse position counter need have only as many stages as is required to count the store areas between index marks. Alternately, any conventional predetermined count register having adjustable count setting means can easily be modified for use in the coincidence circuit of Fig. 7. A reset line 715 including a switch 715*a* is provided to reset the counter to zero upon completion of the count between index markers. Such reset switch can obviously be automatically operated if desired. The pulse position counter 113 is connected to the referred to lead 102*b* as shown in Fig. 1 and is therefore advanced one count upon each entry as manifested by actuation of the keys of the transcriber 100. It will be thus apparent that at some particular instant of time the reading in the pulse position counter 113 must correspond with the reading in the synchronizing pulse counter 116. For example, suppose the pulse position counter 113 has been advanced once. As soon as the synchronizing pulse counter 116 has clicked off one count, coincidence will have been achieved as manifested by an output signal emanating from coincidence detector 115. Similarly, suppose the pulse position counter has been actuated as a result of 5 entries made in the transcriber. In such event the coincidence detector 115 will be energized when the synchronizing pulse counter has clicked off 5 times as a result of having sensed 5 synchronizing marker pulses on the synchronizing channel S of the tape after the period of initiation determined by an index marker 20.

The coincidence circuit 115 employed consists of a symmetrical gating arrangement as shown in Fig. 7. Corresponding sections of each counting stage of the synchronizing pulse counter 116 and pulse position counter 113 are connected by leads such as 703, 706, and 707, 708 to corresponding and-gates 709, 710 of the type represented by chart (*a*) in Fig. 8. The outputs of each corresponding stage of the counters 116, 113 are thereby connected to one pair of and-gates respectively. The remaining stages are similarly connected. Each of the identified pairs of and-gates such as 709, 710 are in turn connected to an or-gate 711*a*, 711*b* etc. The outputs of each or-gate 711 are in turn collectively applied to an and-gate 712, the output of which is manifested as a signal in lead 115*a* of Fig. 1.

The function and operation of the coincidence system shown in Fig. 7 may now be explained. Both the synchronizing pulse counter 116 and the pulse position counter 113 are similar in construction (see Fig. 8C) and have a like number of stages 703 and 704, respectively.

As is well known, the count registered by a multistage bi-stable counter is manifested by the state of conduction of each individual stage. By convention, the shaded portion of the rectangle in Fig. 7 denotes conduction of a like stage section. Convention also determines the significance of the state of conduction. Thus the "normal" state of a stage may arbitrarily be represented by a condition in which the left-hand section is conducting and such normal state can also be assumed to represent a "0" in the binary system.

Thus, the first four stages of the synchronizing pulse counter 116 as shown in Fig. 7 will register "0 0 0 1" and will correspond to a "0 0 0 1" registration in the pulse position counter 113. Under such conditions, it will be apparent that all three of the and-gates 709, 710, 709*a*, 710*b*, and 709*b*, 710*b*, will be actuated to transmit signals through or-gates 711*a*, 711*b*, 711*c*, and 711*d* and will thereby activate the coincident gate 712. It will be apparent that the lack of registration of like representations in each register will preclude activation of coincidence gate 712 since, in such event, at least one of a pair of gates 709, 710 will not be energized and the gate 712 will thereby be inhibited. In this manner a signal will be applied through lead 115*a* to the "read" gate 109 in Fig. 1 when the counts registered in the synchronizing pulse counter 116 coincide with the number counted by pulse position counter 113. As previously explained, such coincidence establishes the precise location of a store area in respect to the transcribing head.

The construction and operation of the above components having been described, the overall system shown in Fig. 1 can now readily be explained.

The immediate purpose of the apparatus shown in Fig. 1 is to secure an accurate recording in a particular store area of a vertical column of magnetized spots comprising the rows *a*, *b*, *c*, and *d* (Fig. 2) in response to the depression of any selected key in the keyboard 100*a* of the transcriber 100. Colaterally to such purpose, a printed symbol will appear on the record sheet of the adjacent transcriber 100' which corresponds to the intelligence represented by the depressed key, but actually results from a subsequent reading of the recorded entry.

When a particular key of the transcriber 100 has been depressed, to effect an entry, a common signal will be transmitted through conductor **102*b* and a coded signal will be concurrently manifested in conductors 102*a* in parallel as has already been described. The chain of tubes comprising buffer storage 103 is thereby energized by the signals received from lines 102a** according to a pattern corresponding to the binary code determined by the coding mechanism of the transcriber. In the present case a 4-place word corresponding to a column of information as shown in Fig. 2 will be stored.

The buffer storage 103 is a conventional and well known circuit comprising a series of bistable trigger stages essentially the same as that illustrated in Fig. 8D. The normal state of each stage may be such that the left-hand side of each stage is normally conducting as indicated by the cross-hatching lines in Fig. 1. The concurrent application of any number of signals from 0–4 by the conductors 102 will result in triggering of a corresponding number of stages of the storage 103 from the normal state shown.

Once the buffer storage 103 has been set to store a particular coded value, it maintains such state until reset by a signal obtained from conductor **112*a* and applied to the storage device 103 through a delay line 123** which applies such signal in parallel to each stage as shown.

Each stage of the storage device 103 is connected to a respective one of the tape record gates 104. These gates are and-gates of the type illustrated in Fig. 8A and are each further energizable by leads extending from the referred to print on tape signal line **112*a*. As will later be described, the appearance of a print signal on conductor 112*a* will cause those of the tape record gates 104 which are energized by an output signal from the buffer storage to energize the respective transducer head in the transcribing head 300. The terminals labeled "1," "2," "3," and "4" adjacent to the gates 104. in Fig. 1 are each connected to like designated terminals forming inputs to the respective amplifiers 107 which cooperate with the transducer heads. The amplifiers 107** may be of the type described in detail in the referred to copending application of Sorrells and each comprises a circuit which permits a single transducer head to both record and sense magnetic information signals.

The collateral common signal transmitted through conductor **102*b* corresponding to the depression of a selected key of the transcriber is concurrently applied to the or-gate 122 and pulse position counter 113. The pulse position counter 113 is thereby advanced one count while the gate 122 transmits the signal to a bistable type of switch device 121. The signal gating device 122 may have a basic circuit similar to that illustrated in Fig. 8D but is arranged to have two input leads 122*a* and 120*a* and an output 121*b*. Such device characteristically is rendered conductive to control gate 120 when triggered by a signal on a first of the inputs 122*a* and the duration of such output control signal is determined by the subsequent application of a signal to the second input 120*a*. For a description of such circuit, attention is directed to pages 87–89 of "Electronics Experimental Techniques," by Elmore and Sands. The application of the referred to signal from the transcriber through input lead 122*a* results in a change of state of the gate 121 and the consequent application of a continuing output control signal to and-gate 120 through lead 121*b***.

The referred to tape reading photocell 119 described in connection with Figs. 3–6 is shown in Fig. 1 as providing a second input to gate 120 precisely at the commencement of a cycle of the transducer head. As previously pointed out, cycling the transducer head will cause the generation of a pulse when the slot 311 (Fig. 3A) scans one of the marker perforations 20 in the tape. The resulting application of such pulse together with the concurrent application of the described control signal from the gating device 122 will therefore produce an output signal from gate 120 which functions to: (1) reset the bistable gate 121 to its normal condition and thereby cancel any output signal on line **121*b*, and (2) trigger the bistable signal gating element 118. In this manner, the synchronizing pulse counter 116** is readied for counting.

The gating device 118 is similar in construction and function to the bistable gate 121 and, when triggered by the signal applied from gate 120 through **120*a*, applies a continuing energizing pulse to and-gate 117 for a duration determined by the subsequent application of a pulse applied by "clear" line 109*a***.

Gate 117 is thus kept readied, and, when the transducer head 300 associated with the described synchronizing channel S on the tape senses the first occurring pre-recorded synchronizing marker pulse, as the head sweeps the particular length of the tape which has been positioned to be scanned by the head, a pulse will be applied as a second input to and-gate 117 and an output signal is thereby concurrently delivered to (1) the synchronizing pulse counter 116, (2) the "print on tape" and-gate 112. and (3) the "read" and-gate 109. It is therefore apparent at this point, that the pulse initiated by the depression of a key on the transcriber has already advanced the pulse position counter 113 one count where the count is stored and now has also allowed the synchronizing pulse counter 116 to count off the first synchronizing marker pulse read from the synchronizing channel S. A condition of coincidence has obviously been established and the coincidence detector 115 described in connection with Fig. 7 now functions to deliver an output signal to both gates 109 and 112, respectively. It is also clear, that gates 109 and 112 at such instant will be under the influence of two inputs, namely that obtained from gate 117 and that from coincidence detector 115. A third input signal must be provided before these gates can conduct.

The required third input to "read" gate 109 and "print" gate 112 are supplied by the two output leads **111*b* and 111*a* obtained from a bistable gating device 111. Such device is similar in construction to the described bistable member 121 but is connected to deliver output pulses from each stage depending upon the particular state or condition of that stage. In the instant case, member 111 is employed so as to establish "print" gate 112 as normally open and "read" gate 109 as normally closed. Consequent to such initial condition, a print signal will therefore be transmitted from gate 112 and will be applied through conductor 112*a*** as follows:

(1) The print signal will be transmitted by lead **112*a* and applied in parallel to the tape print gates 104 and thereby initiate the described recording action in which the information already stored in the buffer storage 103 will be inscribed on the tape through amplifiers 107 and the multiple channel recording head 300**.

(2) The signal will also be applied to delay element 123 and, after a requisite delay period, will clear and thus ready the buffer storage for a subsequent operation.

(3) The print signal will be applied through or-gate 122 to the bistable member 121 and change its state from its normal state and thus ready gate 120 for a next reading operation so that on arrival of a unit pulse from photocell 119 the synchronizing pulse counter will start again to count.

(4) The print signal is also fed back through or-gate 110 and thereby: (*a*) triggers member 111 from its normal state to cut off the normally open print gate 112 and open the normally closed read gate 109; (*b*) is applied as a clearing signal through conductor **109*a* to reset the synchronizing pulse counter 116 and the bistable member 118**.

At this point in the operation, the information corresponding to the key depressed has been printed on the tape; the buffer storage 103 has been cleared and readied, the print gate 112 has been closed and the read gate 109 is now open. During the next cycle of the transducer head, it will commence to sweep the same area of the tape and will therefore in this instance initially read the column of information previously recorded as has just been described. The signals induced in the transducer as a result of such sensing (see waveform (*c*) in Fig. 2A) will be applied to the read gates 108. The gates 108 are and-gates of the type shown in chart (*a*) of Fig. 8. The required second input to each of these "read" gates is obtained from the output of "read" gate 109 in the following manner.

During such reading cycle of the transducer head, the photocell 119 in re-scanning the same portion of the tape will have again initiated synchronizing pulse counter 116 in exactly the same manner as in the previously described recording or printing operation. It must also be remembered that the pulse position counter 113 has memorized the entry pulse previously applied through lead 102*b* consequent to the referred depression of a selected key. Accordingly, when the same first synchonizing pulse, for example, is sensed by the synchronizing channel reading head during such sensing cycle, coincidence is again achieved and the coincidence detector 115 will apply a pulse to the read gate 109 which has now been readied by control 111 as described. The gate 109 will therefore, at such time, apply a pulse through lead 109*a* to each of the information channel read gates 108 and these gates, depending upon the character of the information read from the tape will conduct and the information signals will be applied through cable 101 to the code translator mechanism, described in connection with Fig. 9, of the auxiliary transcriber 100′. The transcriber will therefore function to convert such signals and print the resulting intelligence on the paper record sheet so that the operator will know exactly what has been recorded on the tape.

The output of gate 109 is also applied through or-gate 110 to reset the bistable device 111 to its normal condition in which gate 109 is held closed while gate 112 is held normally open. In this manner, the mechanism of Fig. 1 enables, during a brief millisecond interval, the inscribing of information on a recording medium and the subsequent transcription of such recorded information into legible form.

*Application of inscriber-outscriber mechanism to error checking*

In accordance with the described operation of the device, it is clear that the information finally printed out on the record sheet carried by transcriber 100′ is obtained only after the intended information has first been inscribed on the record medium or tape T and then sensed. Such information may or may not represent that which was intended to be stored by striking a selected key of transcriber 100.

The outscriber 100′ will print only what has actually been sensed from the tape. That is, if the proper key on the transcriber were indeed depressed and the circuitry comprising the invention is functioning accurately, the information printed out by the outscriber will actually represent the correct information desired to be inscribed.

It is well known, however, that recording mediums such as magnetic tapes inherently carry numerous blemishes or spots which occur during the process of manufacture. Some of these blemishes are sufficiently large so as to cause the generation of spurious signals corresponding in amplitude to those of a desired magnetized spot on the tape (see Fig. 2A). The sensing of such spot would obviously be manifested as an erroneous output by the outscriber. In the past, great care has been taken to process the tapes to minimize surface blemishes. As a further precaution, the tapes are generally pre-edited before use in order to determine the location of such blemishes. Similarly in the case of a magnetic drum, the surface must be machined to exacting specification and the surface further treated to minimize defects. In addition, tube misoperation and circuit component defects can obviously cause either the recording or reading circuits to deliver erroneous information not conforming with the intelligence intended to be transcribed. Further, typographical errors often occur as when the operator inadvertently strikes a key other than the one he intends to actuate.

In any case, the discrepancy is immediately manifested by visual observation of the symbol printed out on the record sheet cojointly with the striking of a key which, it must be remembered, results not directly from the manipulation of the keyboard, but indirectly after a comparison with the information recorded on the magnetic surface. According to the present invention, the existence of a flaw on the magnetic surface would be sensed by the transducer heads and therefore would be manifested as a printed signal in the transcriber. However, such resulting printed symbol would not correspond to the information desired to be inscribed. The same result would obtain if there were an error in the operation of the circuitry as for example a defect in a tube or other circuit component. In other words such errors become immediately apparent because of the visual representation of the discrepancy between the key struck and what appears on the paper. The operator is therefore immediately apprised of such error and the exact physical location of such error is known because of the described action of the coincidence circuit. It is therefore only necessary for the operator to open the back spacer key 114 shown in Fig. 1. Such key, as shown in Fig. 7 includes a normally closed switch which opens the input terminal 702 of the pulse position counter 113 to prevent further advancement of such register. The operator may now easily locate and correct the exact column of coded information in which an error has been detected by merely recording the correct information directly over such erroneously recorded area. That is, since the transducer head is continuously cycling with respect to the referred to area on the recording surface, and since the back spacer key 114 is now open, depression of a key on the transcriber cannot now advance pulse position counter 113 and the previous count will remain stored therein. The recording circuit operates as before and the synchronizing pulse counter will therefore locate an area on the tape coinciding with the number memorized by pulse position counter 113. Such area can only be the same area in which the immediately preceding recording operation has occurred and the apparatus will therefore record the correct information by writing over the previous record.

The process of information recording continues, step by step, in the described manner until all of the referred to store areas provided for the recording of information as defined by the vertical columns corresponding to each of the pre-stored synchronizing pulses between adjacent markers 20 is used up. Such condition will be indicated by the pulse position counter 113 which registers up to a predetermined number conforming to the number of store areas between markers on the tape. Upon completion of such count, the pulse position counter is cleared, all circuits are locked out and, concurrently, the signal is applied to the tape handling mechanism (Fig. 6) to cause shifting of the tape to present a new recording area to the transducer.

The described invention may be obviously employed as an outscriber for transcribing information from a recording. By utilizing only the reading and printing-out functions of the apparatus, a recording, such as a tape for example, can be transcribed, area by area in the described manner.

The present invention also facilitates locating any desired store area on a magnetic record provided with a synchronizing channel. The transcriber 100 as is well known includes a key such as a spacer key which does not represent information but which will transmit a single entry pulse on line 102b when actuated. The operator need only depress such key a requisite number of times to locate a desired store area on the tape. The coincidence circuit will thereafter automatically gate the scanning head to read only at that predetermined location.

While a preferred embodiment of the invention has been shown it is apparent that the concept underlying the invention may be embodied in a variety of forms and modifications. The particular character of the recording means employed for example, is not restricted since the principles of transcription employed are applicable to recording mediums of any type as has been explained. The use of magnetic transducers is convenient and preferable but the principles of the invention are easily adaptable to record markings of any type. It is therefore not intended to limit the invention except to the extent outlined in the appended claims.

What is claimed is:

1. In a device for inscribing information in sequence as separate entry groups on a record medium of a type including an inscribable area having a first synchronizing channel provided with a series of pre-inscribed synchronizing markers spatially arranged to define discrete store areas for accommodating each such entry group and at least one inscribable channel for said store areas coextensive with said synchronizing channel, information transcribing means comprising, an output manifesting means and an information entry selection mechanism for converting said entry into coded signals, means responsive to said selection mechanism for storing said signals responsive to an entry and for registering the order of occurrence of each such entry, recording and sensing means for cyclically scanning the extent of said inscribable area, means responsive to said selection mechanism and said sensing means for repetitiously counting said synchronizing markers synchronously with said cyclical scanning means, coincidence means for detecting coincidence between said registering and counting means, means responsive to said coincidence detector and said storing means for energizing said recording means upon coincidence between said registration and counter during a cycle of said scanning means, and means responsive to said coincidence detector and said sensing means for actuating the output manifesting means of said transcriber during a subsequent cycle of said scanning means.

2. In a device for inscribing information in sequence as separate entry groups on a record medium of a type including an inscribable area having a first synchronizing channel provided with a series of pre-inscribed synchronizing markers spatially arranged to define discrete store areas for accommodating each such entry group and at least one inscribable channel for said store areas coextensive with said synchronizing channel, information transcribing means comprising an output manifesting means and an information entry selection mechanism for converting said entry into coded signals, means responsive to said selection mechanism for storing said signals responsive to an entry and for registering each such entry in order of occurrence, recording and sensing means for cyclically scanning the extent of said inscribable area, means responsive to said selection mechanism and said selection means for repetitiously counting said synchronizing markers synchronously with said cyclical scanning means, coincidence means for detecting coincidence between said registering and counting means, means responsive to said coincidence detector and said storing means for energizing said recording means upon coincidence between said registration and counts during a cycle of said scanning means, means responsive to said coincidence detector and said sensing means for actuating the output manifesting means of said transcriber during a subsequent cycle of said scanning means, and control means articulated with said cyclical scanning means for alternately actuating said energizing and actuating means respectively.

3. In a device for inscribing information in sequence as separate entry groups on a recording medium of the type including an inscribable area having a first series of pre-inscribed index markers defining spaced record areas and a first synchronizing channel provided with a second series of pre-inscribed synchronizing markers spatially arranged in each of said record areas defined by the index markers to define discrete store areas for accommodating each such entry group and at least one inscribable channel for said store areas coextensive with said synchronizing channel, information transcribing means comprising, an output manifesting means and an information entry selection mechanism for converting said entry into coded signals, means responsive to said selection mechanism for storing said signals responsive to an entry and for registering each such entry in order of occurrence, recording and sensing means for cyclically scanning the extent of said inscribable area defined by adjacent index markers, means responsive to said selection mechanism and said sensing means for repetitiously counting said synchronizing channel markers synchronously with said cyclical scanning means, count initiating means cooperable with said scanning means and controlled by said index markers and by said entry selecting mechanism for initiating said counting means at an instant conforming to the start of a scanning cycle, coincidence means for detecting coincidence means for detecting coincidence between said registering and counting means, means responsive to said coincidence detector and said storing means for energizing said recording means upon coincidence between said registrations and counts during a cycle of said scanning means, and means responsive to said coincidence detector and said sensing means for actuating the output manifesting means of said transcriber during a subsequent cycle of said scanning means.

4. The invention as defined in claim 3 including a control means articulated with said cyclical scanning means for alternately activating said energizing and actuating means respectively.

5. In a device for inscribing information as separate entry groups on a recording medium of the type including an inscribable area having a first series of pre-inscribed index markers defining spaced record areas and a first synchronizing channel provided with a second series of pre-inscribed synchronizing markers spatially arranged in each of said record areas defined by the index markers to define discrete store areas for accommodating each such entry group and at least one inscribable channel for said store areas coextensive with said synchronizing channel, information transcribing means comprising an output manifesting means and an information entry selection mechanism for converting said entry into coded signals, means responsive to said selection mechanism for storing said signals responsive to an entry and for registering each such entry in order of occurrence, recording and sensing means for cyclically scanning the extent of said inscribable area defined by adjacent index markers, means responsive to said selection mechanism and said sensing means for repetitiously counting said synchronizing channel markers synchronously with said cyclical scanning means, count initiating means cooperable with said scanning means and controlled by said index markers and by said entry selecting mechanism for initiating said counting means at an instant conforming to the start of a scanning cycle, coincidence means for detecting coincidence between said registering and counting means, a first controlled means responsive to said coincidence detector and said count initiating means for connecting said storing means to said recording means on the occurrence of coincidence between said registrations and counts during a cycle of said scanning means, and a second controlled means responsive to said coincidence detector and said count initiating means for connecting said sensing means to said output manifesting means on the recurrence of coincidence between said registrations and counts during a subsequent cycle of said scanning means.

6. The invention according to the structure defined in claim 5 including a control device articulated with said cyclical scanning means for alternately activating said first and second controlled means respectively.

7. The structure as defined in claim 6 including a resetting means responsive to the outputs of said first and second controlled means for energizing said control device, said synchronizing marker counting means and said count initiating means.

8. The invention according to the structure defined in claim 5 in which said entry registering means includes a selectively actuated means for preventing further registration of an entry in response to actuation of said information entry selection mechanism.

9. In a device for inscribing information in sequence on a record medium of a type including an inscribable area having pre-inscribed markers spatially arranged to define discrete store areas for each information entry, information inscribing means comprising, means for displaying the information entry to be inscribed, means for selecting each such information entry, recording and sensing means for cyclically scanning the extent of said inscribable area, means responsive to said selecting means and said sensing means for registering the position of each of said markers, means responsive to said selecting means for storing the information entry to be inscribed and for concurrently memorizing the order of occurrence of said entry selection, coincidence means energizable by said position registering and said entry memorizing means for correlating the spatial position of a marker with the order of occurrence of said entry selection, means including said storing means and actuated by said coincidence means for energizing said recording means to inscribe said stored information entry in a store area defined by the spatial position of said correlated marker and means responsive to said coincidence means during a subsequent cycling of said recording and sensing means for actuating said display means in accordance with said inscribed information entry.

References Cited in the file of this patent

UNITED STATES PATENTS

| | | |
|---|---|---|
| 2,614,169 | Cohen | Oct. 14, 1952 |
| 2,679,638 | Bensky | May 25, 1954 |
| 2,714,843 | Hooven | Aug. 9, 1955 |

UNITED STATES PATENT OFFICE

CERTIFICATE OF CORRECTION

Patent No. 2,827,623 March 18, 1958

Ernest F. Ainsworth

It is hereby certified that error appears in the printed specification of the above numbered patent requiring correction and that the said Letters Patent should read as corrected below.

Column 15, line 66, for "selection" read -- sensing --; column 16, line 30, strike out "means for detecting coincidence".

Signed and sealed this 29th day of April 1958.

(SEAL)
Attest:

KARL H. AXLINE

Attesting Officer

ROBERT C. WATSON
Commissioner of Patents